Jan. 5, 1937.  A. T. KOPPE  2,066,890
PHOTOCOMPOSING MACHINE
Filed July 18, 1935   8 Sheets-Sheet 1
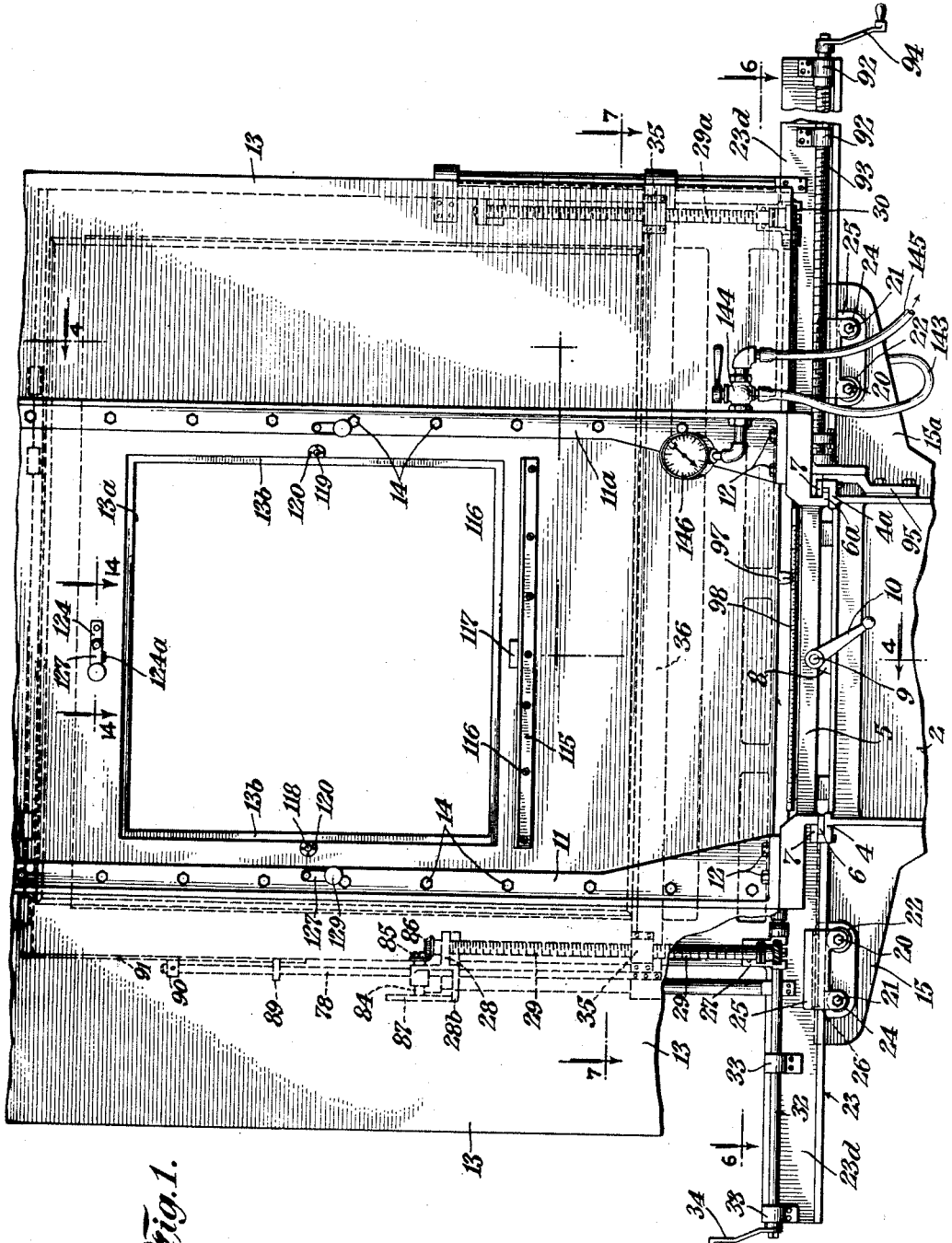
Fig. 1.
INVENTOR
Alexander T. Koppe
BY
ATTORNEYS Jan. 5, 1937.  A. T. KOPPE  2,066,890
PHOTOCOMPOSING MACHINE
Filed July 18, 1935   8 Sheets-Sheet 3

INVENTOR
Alexander T. Koppe
BY
Ward, Crosby & Neal
ATTORNEYS

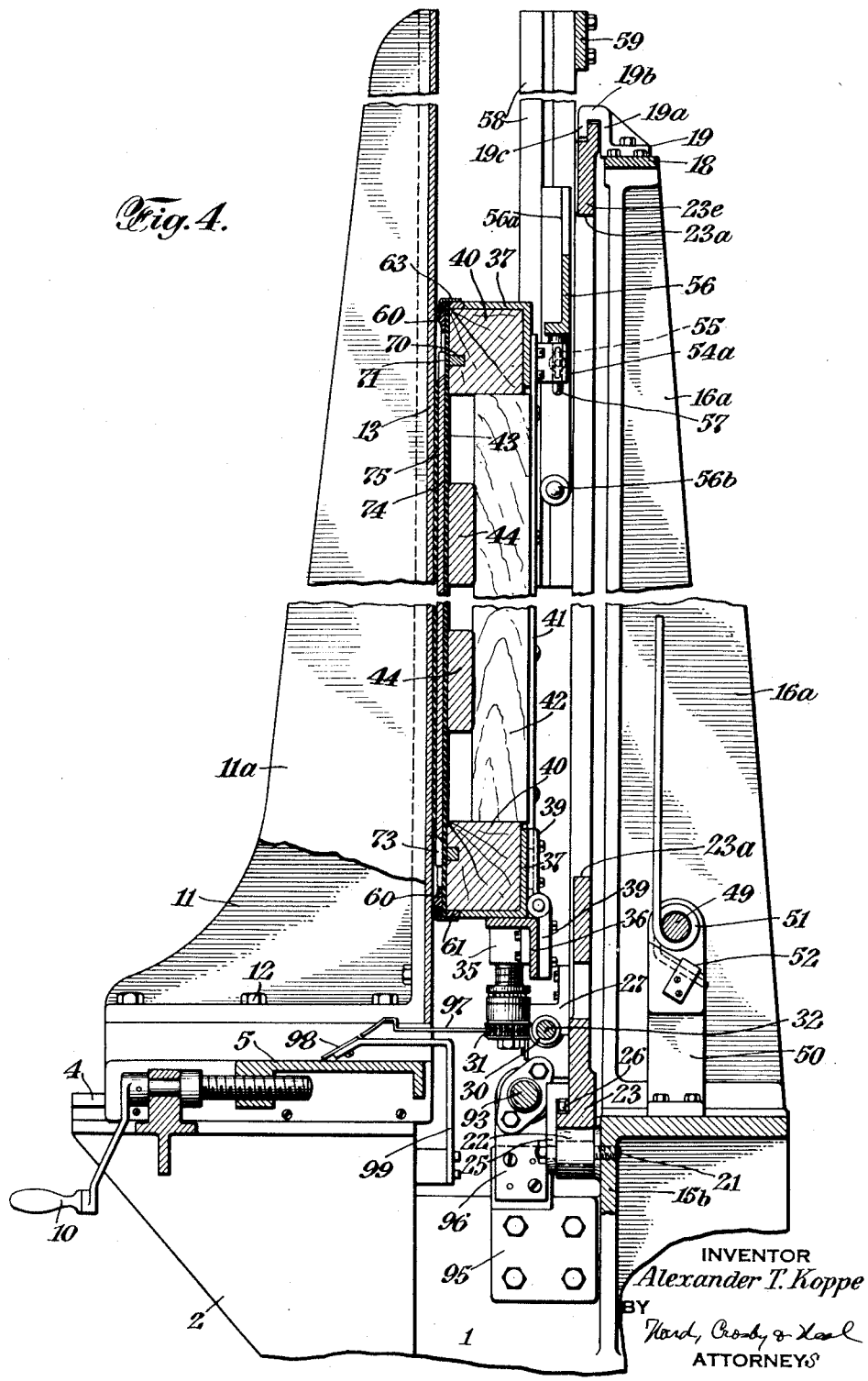

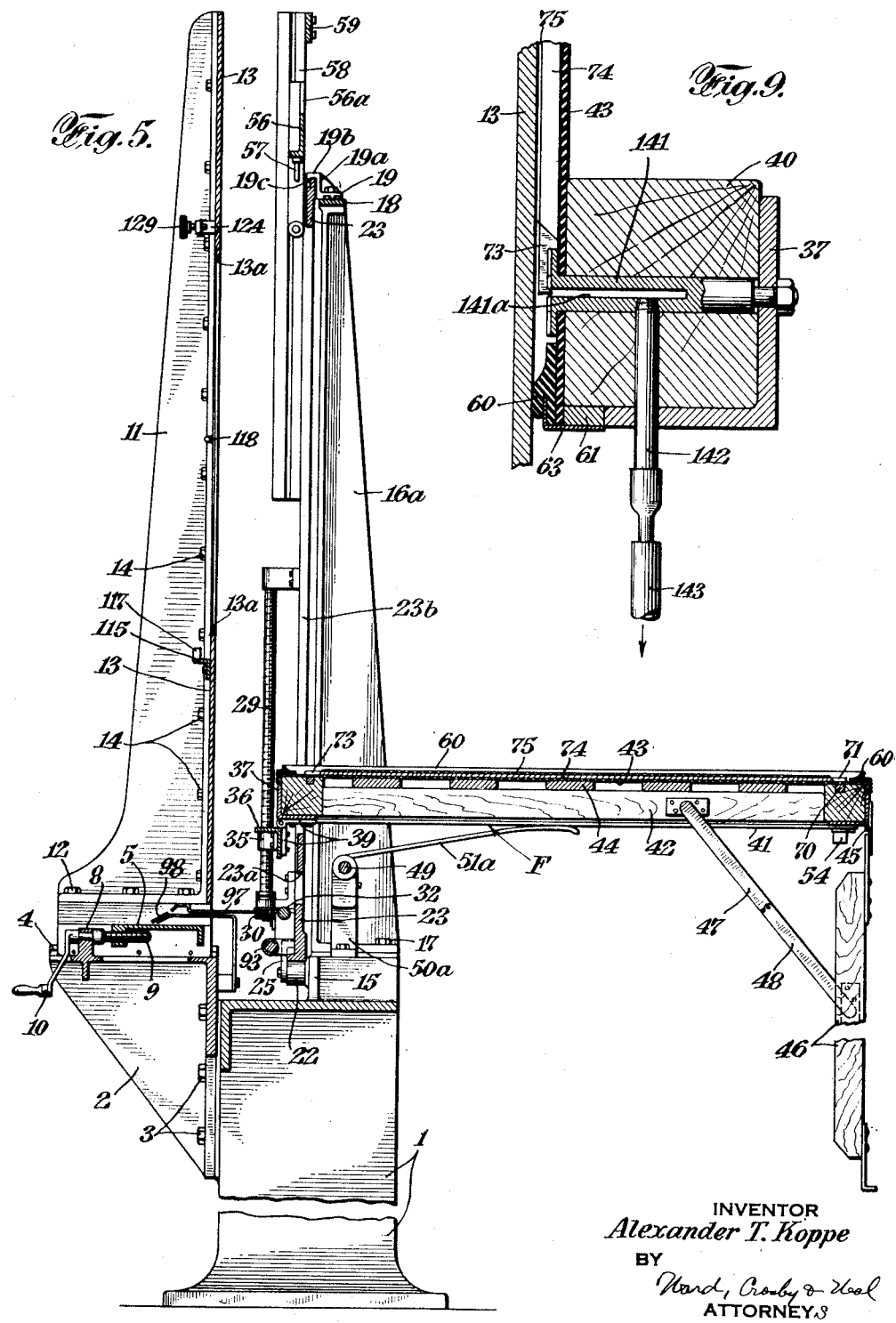

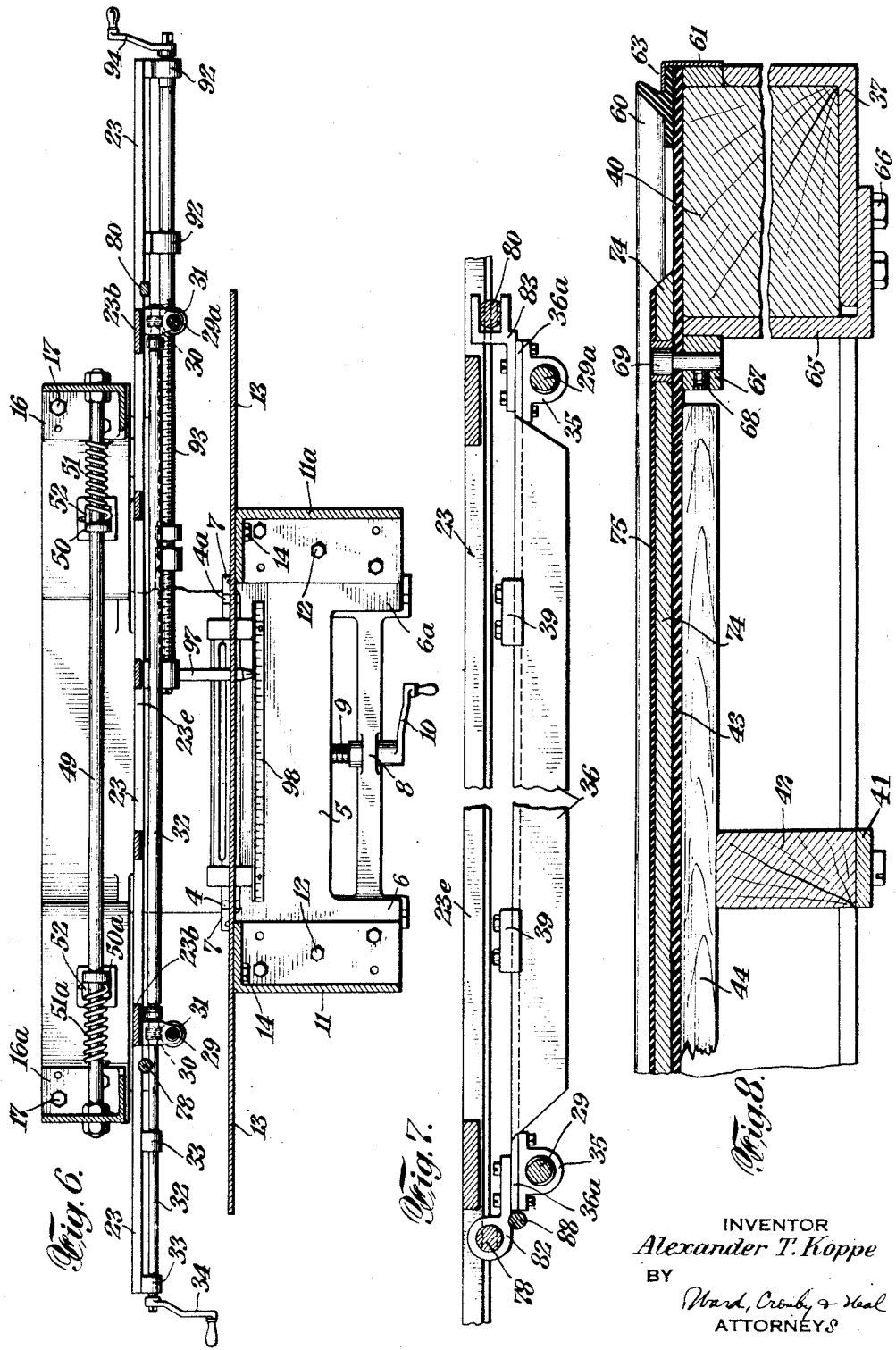

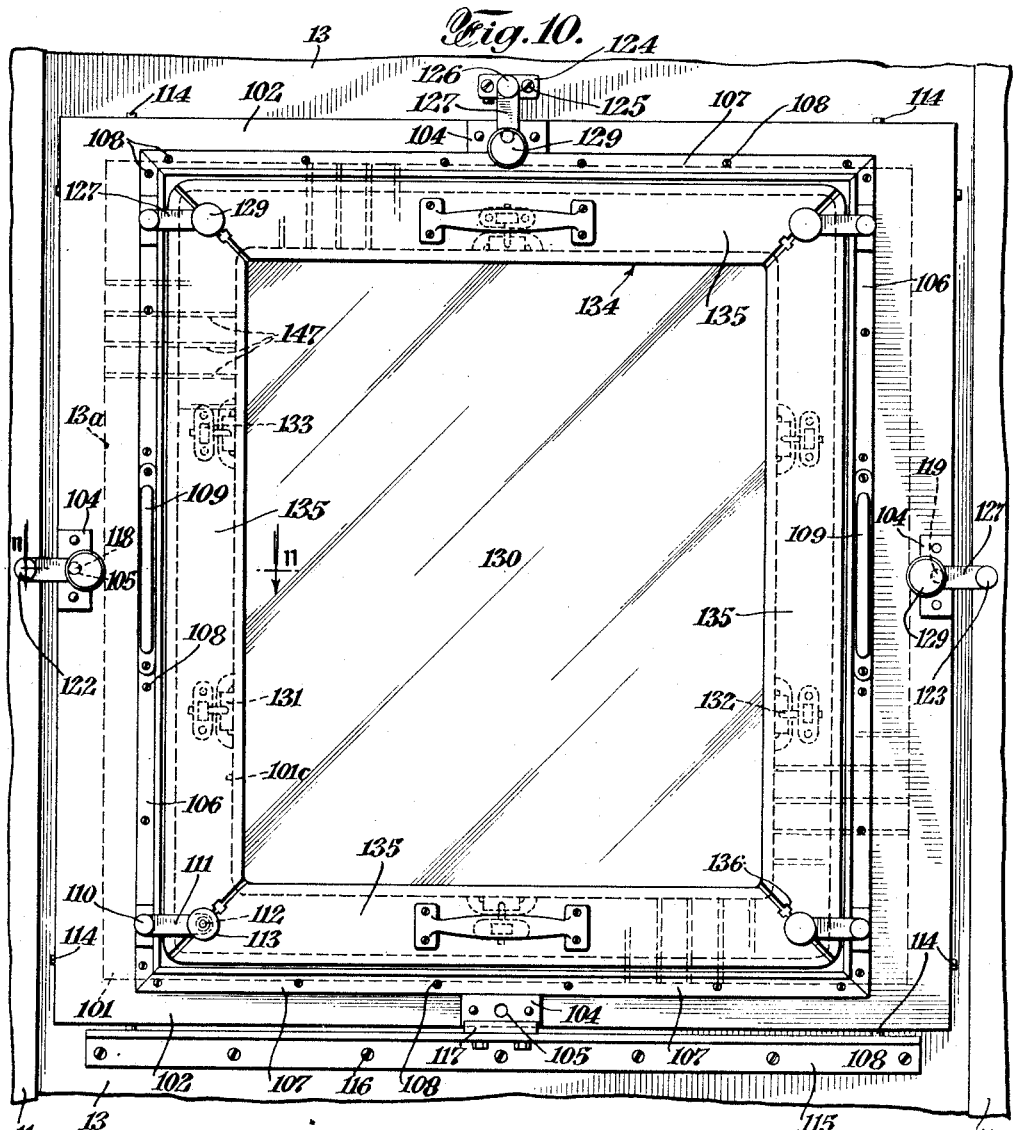

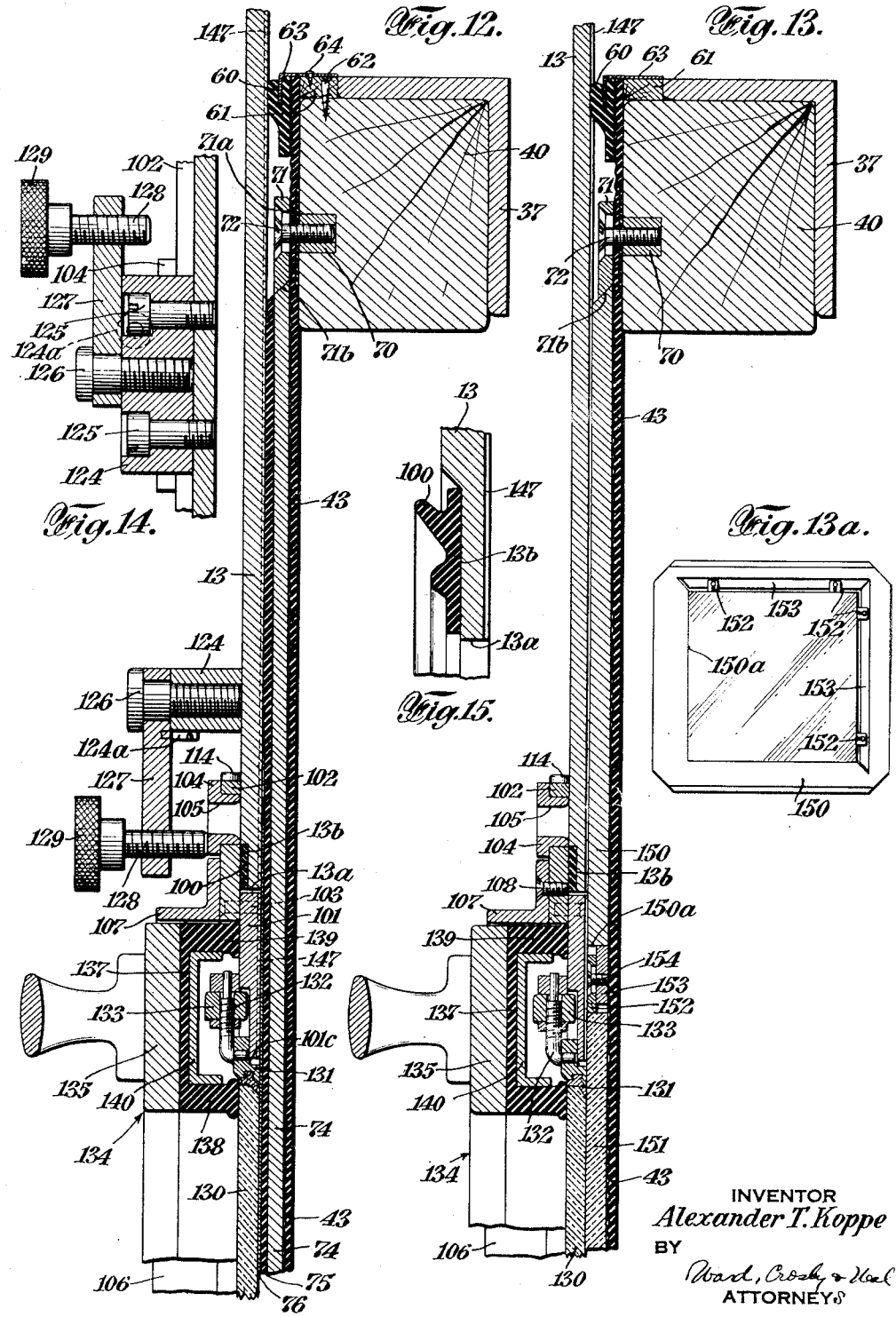

Patented Jan. 5, 1937

2,066,890

UNITED STATES PATENT OFFICE 2,066,890

PHOTOCOMPOSING MACHINE

Alexander T. Koppe, Hasbrouck Heights, N. J., assignor to General Printing Ink Corporation, New York, N. Y., a corporation of Delaware Application July 18, 1935, Serial No. 31,987

14 Claims. (Cl. 95—76)

My invention relates to improvements in photocomposing machines.

My invention has particular reference to photocomposing machines of the type comprising a frame on which a light-sensitive surface is supported in substantially a vertical plane during those periods when said light-sensitive surface is exposed to the action of the projecting light beam.

With a photo-composing machine of the character stated, my invention further comprises an arrangement forming a vacuum chamber within which said light-sensitive surface is entirely enclosed.

Various other objects, advantages and characteristics of my invention will become apparent from the following detailed description.

My invention resides in the photo-composing machine, vacuum chamber means, arrangements, features and combinations of the character hereinafter described and claimed.

For an understanding of my invention and for an illustration of some of the many forms thereof, reference is to be had to the accompanying drawings, in which:

Figure 1 is a front elevational view, partly broken away and with parts removed, of a photo-composing machine as constructed in accordance with my invention;

Fig. 4 is an enlarged transverse, vertical sectional view, partly in elevation, and is taken substantially on the line 4—4 of Fig. 1 looking in the direction of the arrows;

Fig. 5 is a central, transverse vertical sectional view of the machine shown in Fig. 1 with some parts in different positions;

Fig. 6 is a horizontal sectional view, partly in plan, and is taken substantially on the line 6—6 of Fig. 1 looking in the direction of the arrows;

Fig. 7 is a horizontal sectional view, partly in plan, and is taken substantially on the line 7—7 of Fig. 1 looking in the direction of the arrows;

Fig. 8 is an enlarged, horizontal sectional view, partly in plan, and is taken substantially on the line 8—8 of Fig. 3 looking in the direction of the arrows;

Fig. 9 is a vertical sectional view, partly in elevation, and is taken substantially on the line 9—9 of Fig. 2 looking in the direction of the arrows;

Fig. 10 is a front elevational view showing the negative frame in operative position;

Fig. 11 is an enlarged horizontal sectional view taken substantially on the line 11—11 of Fig. 10 looking in the direction of the arrows;

Fig. 12 is an enlarged, transverse vertical sectional view, partly in elevation, showing a preferred arrangement for sealing the negative-carrying plate with respect to the light-sensitive surface;

Fig. 13 is an enlarged, transverse vertical sectional view, partly in elevation showing another application of the invention;

Fig. 13a is a plan view, with parts omitted, of the application of the invention of Fig. 13;

Fig. 14 is an enlarged, horizontal sectional view and is taken substantially on the line 14—14 of Fig. 1 looking in the direction of the arrows; and Fig. 15 is an enlarged sectional view, partly in elevation, showing a sealing strip.

Figure 2:
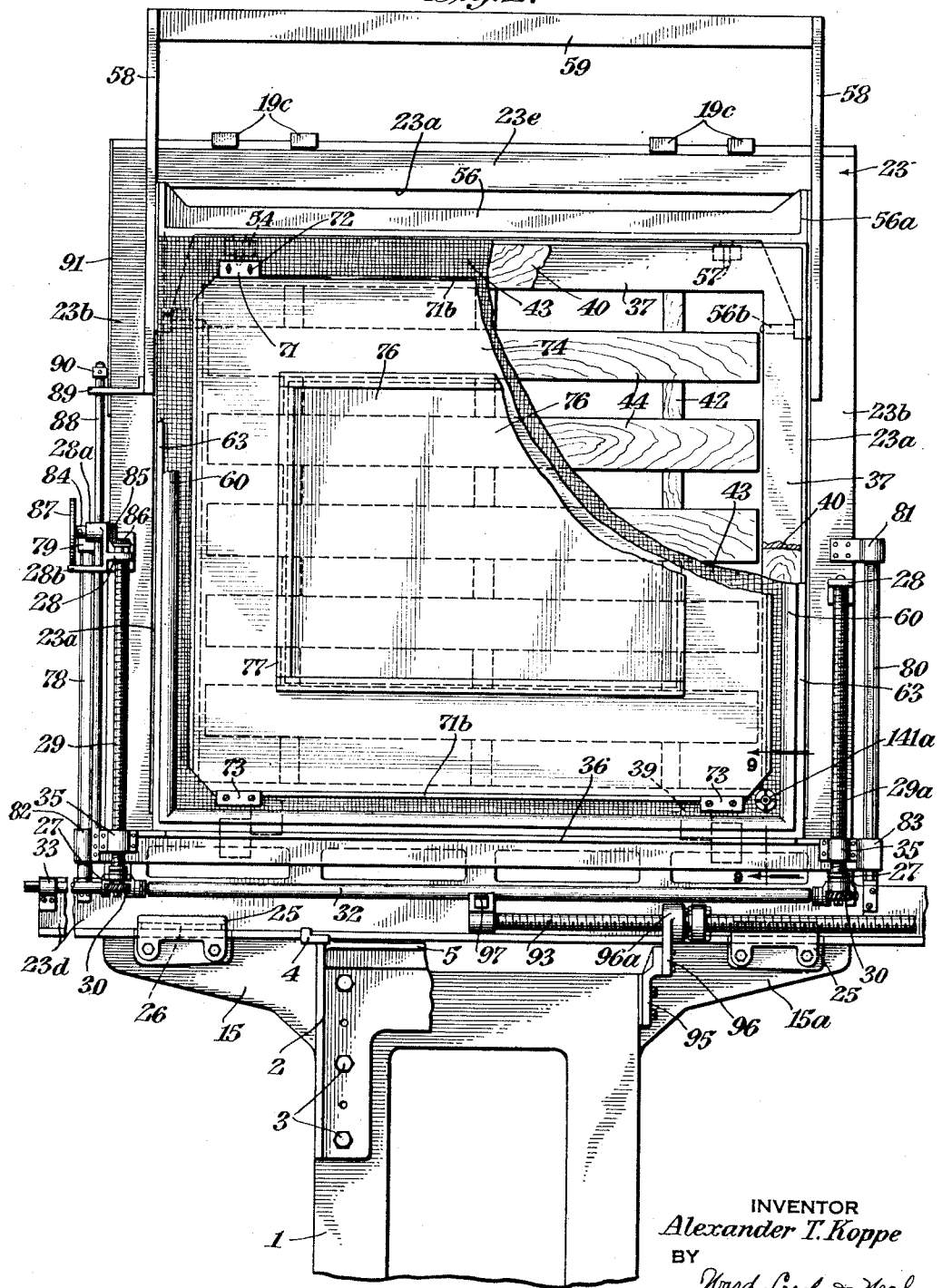
Fig. 2 is a front elevational view, partly broken away, of the machine shown in Fig. 1 as it appears with some parts removed.

Referring to Fig. 5, I represents a vertically extending base having a bracket 2 secured thereto in any suitable manner, as by the bolts 3, the bracket 2 being so shaped as to define a pair of spaced, horizontally extending tracks 4, 4a, Fig. 1. A movable support 5 is carried by the bracket 2 and this support is formed with a pair of spaced, horizontally extending surfaces 6, 6a which slidably rest on the respective tracks 4, 4a. Members 7 secured to the respective tracks 4, 4a may be utilized for retaining said surfaces 6, 6a in operative position on said tracks. A lug 8 upstanding from the bracket 2, Figs. 1, 4 and 5, has journalled therein a screw 9 which is threaded through a depending section of the support 5. The screw 9 may be operated by a suitable handle 10 to effect movement of the support 5 from left to right or vice versa, Figs. 4 and 5.

A pair of upstanding standards 11, 11a are suitably secured, as by bolts 12, to the support 5 at opposite sides thereof. These standards 11, 11a carry a plate 13 which is secured thereto in any suitable manner, as by the bolts 14. The plate 13, then, is supported in vertical position as clearly shown in Fig. 5 and, as is obvious, is movable back and forth under the control of the screw 9.

Figure 3:
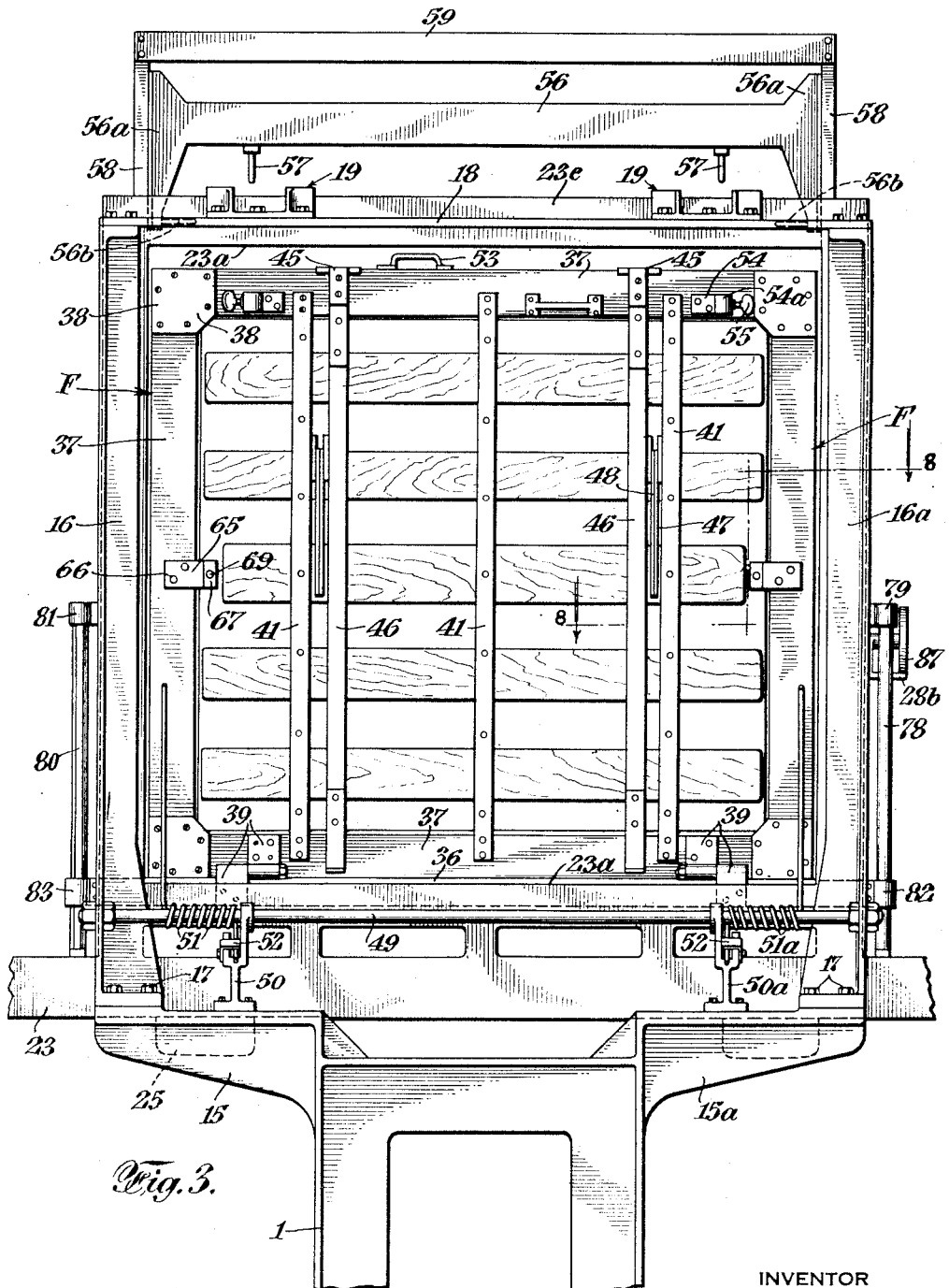
Fig. 3 is a rear elevational view, partly broken away, of the machine shown in Figs. 1 and 2.

As clearly appears from Figs. 1 and 3, the base I comprises oppositely extending bracket arms 15, 15a to the horizontal upper surfaces of which the respective upstanding standards 16, 16a, Fig. 3, are secured in any suitable manner, as by the bolts 17. Secured to the standards 16, 16a at the top thereof is a horizontal member or plate 18 which, as clearly shown in Figs. 4 and 5, carries a pair of spaced guide brackets. Each of these guide brackets comprises a base section 19 bolted or otherwise suitably secured to the plate 18. Each bracket base section 19 terminates in an upwardly extending vertical section 19a, a horizontal section 19b, and a downwardly extending vertical section 19c, the sections 19a, 19b and 19c of each bracket serving as a guiding means in the manner hereinafter described.

Each of the aforesaid bracket arms 15, 15a carries a pair of spaced, horizontally disposed bolts 20 and 21, Fig. 1, each of the bolts 20 having a roller 22 freely rotatable thereon, and each bolt 21 carrying a spacing sleeve 24 of a width corresponding with that of the adjacent roller 22. These rollers 22 constitute the sole support for a member 23 which is horizontally movable thereon under manual control in the manner hereinafter described. Each pair of the bolts 20, 21 carries a flanged plate 25, the plates 25 as shown in Figs. 4 and 5, coacting with and serving as a guide for one side surface of the member 23, the other side surface of which slidably engages spaced boss-like surfaces 15b, Fig. 4, formed on the aforesaid bracket arms 15, 15a. As shown in Figs. 2 and 4, gibs or keys 26 are disposed with the angle formed by the respective plates 25 so that the member 23 may be firmly supported in its intended position.

The member 23 forms the base of a casting which may be apertured as indicated at 23a, Fig. 3, said casting comprising the vertical side members 23b joined by an upper horizontal member 23c, the upper surface of which is engaged by the aforesaid bracket sections 19a, 19b and 19c, Fig. 4. As will readily be understood, in view of the foregoing description, the casting of which the member 23 is the base defines a rectangular frame slidable on the above noted rollers 22. As shown in Figs. 1 and 3, the above noted casting further comprises the horizontal wing sections 23d disposed on the respective opposite sides thereof and forming oppositely extending continuations of the base 23.

Each of the casting side members supports a pair of spaced brackets 27 and 28, these pairs of brackets having vertical jack screws 29, 29a journalled therein, respectively. The lower end of each jack screw 29, 29a terminates in a worm wheel 30, Fig. 5, and each worm wheel 30 meshes with a worm 31, Fig. 2. The worms 31 are secured to a shaft 32 rotatably mounted in suitable brackets 33 carried by the member 23 and its wing section 23d at the left thereof, Figs. 1 and 2. The shaft 32, at its outer end, may be equipped with a crank handle 34, Fig. 1, whereby said shaft 32 may be manually rotated for the purpose hereinafter described.

The threads of the jack screws 29, 29a are pitched to the same degree and each of said jack screws carries a nut 35 which is suitably arranged in threaded engagement therewith, Fig. 2. These nuts 35 are disposed at the same horizontal level and have a horizontally disposed angle iron 36, or the like suitably secured thereto, Fig. 5. Supported by the angle iron 36 is a square or horizontal frame F, Fig. 3, which, in the example shown, comprises four angle irons 37 secured together by corner plates 38, the lowermost angle iron 37 being secured to the angle iron 36 by hinges 39, Figs. 3 and 5.

Each angle iron 37 forms a partial housing for and is suitably secured to a member 40, these members 40 being coextensive in length with the respective angle irons with which they are associated. As shown on the drawings, the members 40 are preferably square or rectangular in section. As shown in Fig. 4, the upper and lower angle irons 37 have a plurality of spaced straps 41 suitably secured thereto. Each of the straps 41 carries a cleat member 42 between which and a suitable flexible member or rubber blanket 43 a plurality of spaced slats 44 are disposed, the flexible member 43 being cemented or otherwise suitably secured to the members 40 of the frame F, and the blocks 44 being secured to the cleats 42. As shown in Fig. 4, the faces of the members 40 and the blocks 41 at the left are disposed substantially in the same plane to thereby form a flat, open surface which is engaged by the aforesaid flexible member 43.

The upper angle iron 37 has secured thereto a pair of spaced hinges 45, each of which carries a standard 46 adapted to be moved into a vertical position when the frame F is disposed horizontally as shown in Fig. 5. For locating and maintaining the standards 46 in vertical position, there is associated with each standard an extensible link mechanism, Fig. 5, which comprises a pair of members 47 and 48, these members being pivoted to each other and the member 47 being pivoted to that cleat member 42 adjacent thereto while the member 48 is pivoted to its standard 46.

It is desirable that the frame F be moved from vertical to horizontal position against spring pressure and, to this end, an arrangement of any suitable character may be employed. For example, as shown in Figs. 3 and 5, there may thus be utilized a rod 49 which is horizontally supported by the aforesaid standards 16, 16a and by a pair of spaced supports 50, 50a upstanding from and secured to the respective bracket arms 15, 15a. Coiled around the rod 49 are a pair of springs 51, 51a disposed, respectively, adjacent the supports 50, 50a. The short end of the spring 51 is locked to the support 50 by a clamp 52 while the long end of said spring 51 engages the left hand angle iron 37 of the frame F. Similarly, the short end of the spring 51a is held in engagement with the support 50a by a clamp 52, the long end of said spring 51a engaging the right hand angle iron 37 of said frame F. As the frame F is positioned in Fig. 4, the springs 51, 51a tend to unwind around the rod 49 in a counterclockwise direction and, therefore, they form a resilient backing for said frame F.

As shown in Fig. 3, the upper angle iron 37 of the frame F carries a handle 53 which may be grasped and manipulated when said frame is to be moved toward and from vertical position. Further as shown in Fig. 3, said upper angle iron 37 carries a pair of spaced brackets 54 each of which comprises a vertically extending sleeve-like member 54a having a set screw 55 threaded into a passage formed in the wall thereof.

A horizontal bar 56 carries a pair of downwardly extending pins 57 which are spaced apart to an extent corresponding with the spacing of the sleeve members 54a. The bar 56 terminates in oppositely facing slide members 56a which engage vertical track members 58, respectively, these slide and track members being connected together in tongue-and-groove fashion as shown on the drawings. As illustrated in Figs. 2 and 3, each of the slide members 56a comprises a laterally extending pin 56b. Accordingly, with the frame F in vertical position, the lateral pins 56b may be grasped to move the bar 56 downwardly, Fig. 3, to cause the pins 57 to enter the respective sleeve members 54a, respectively, Fig. 2. In this manner, the frame F is locked in vertical position and this locking action may be more permanently effected by so turning the set screws 55 that they lock against the respective pins 57.

The vertical track members 58 are permanently anchored to the respective side members 23b of the casting 23 and they may be connected together by an upper bar 59.

In accordance with a preferred form of the invention, the members 40, cleat members 42, slats 44 and standards 46 are formed from wood while the remaining major parts of the frame F are formed from iron. A construction of this character is sturdy and rigid while at the same time being sufficiently light-weight for manual operation.

As shown on the drawings, the aforesaid rubber blanket 43 directly engages the lattice work formed by the members 40 and slats 44. As indicated in Fig. 2, said flexible member 43 is square or rectangular and the periphery thereof is engaged by a sealing strip 60 which is likewise square or rectangular and continuous or unbroken throughout the length thereof.

As illustrated in Figs. 4, 5, 8, 9, 12 and 13, the outer members of each of the angle irons 37 extend only part way to the plane of the flexible member 43. These spaces between the several angle irons and the flexible member 43 are filled by strips 61 of wood or the like, such wooden strips being secured to the adjacent members 40 by wood screws 62, or equivalent, Fig. 12. Brackets 63 are secured to the strips 61 by suitable members such as the tacks 64, these brackets preferably being coextensive in length with the respective strips 61 and having angular ends fastened to the sealing strip 60 whereby the latter is securely retained in its intended position.

As shown in Figs. 3 and 8, each of the vertical angle irons 37, approximately midway between the ends thereof, has an angle bracket 65 secured thereto by bolts 66. These brackets extend along the inner surfaces of the adjacent members 40 respectively, and secured to each of them, immediately below the flexible member 43, is an apertured block 67. Each block 67 has a set screw 68 threaded through the wall thereof and each set screw engages the shank of a pin 69 seated in the block aperture, the head of said pin 69 projecting outwardly from the plane of the flexible member 43, the shanks of the pins 69 extending through said flexible member 43 and seating within the respective sleeve-like members 67.

As indicated in Figs. 2, 4, 12 and 13, that member 40 which is associated with the upper horizontal angle iron 37 is provided with two or more spaced recesses in each of which a member 70 is seated, these members 70 extending to the lower surface of the flexible member 43. Each member 70 is adapted to have a clamping block 71 adjustably secured thereto and, to this end, there may be utilized a pair of screws 72 which extend through elongated slots 71a formed in each block 71, the screws being threaded into the adjacent member 70. As shown in Figs. 12 and 13, the members 71 comprise lower inclined faces 71b utilizable as hereinafter described.

In a manner generally the same as described above, two or more spaced clamping blocks 73 are secured to that member 40 which is associated with the lower horizontal angle iron 37. The blocks 73 are of the same shape as the blocks 71. The former, however, are non-adjustably fixed to said member 40 since they do not comprise elongated slots as do the blocks 71.

With the frame F in vertical position as shown in Fig. 2, the upper inclined surfaces of the lower blocks 73 are disposed in horizontal alinement. Similarly, the upper blocks 71 are disposed in horizontal alinement although it will be understood that said blocks 71 are vertically adjustable due to the presence of the elongated slots 71a.

In accordance with the invention, the blocks 71 and 73 are adapted to retain a plane plate 74 of suitable metal or the like to the frame F. This plate 74, as indicated in Figs. 2 and 12, is provided with inclined or beveled upper and lower surfaces 71b corresponding with the bevel of said blocks 71 and 73. In order to secure said plate 74 in the position shown, the screws 72 for the blocks 71 are slightly retracted whereupon said last named blocks 71 are moved in a direction from the bottom of the frame F. The lower end of the plate 74 may then be seated against the fixed blocks 73 and the upper end thereof placed in the position illustrated in Fig. 12. The blocks 71 are then moved to the respective positions thereof shown in Figs. 2 and 12 whereupon the screws 72 are rethreaded into the members 70. Obviously, with such an arrangement, the plate 74 is secured to the frame F in a detachable manner.

As shown in Fig. 12, the inner surface of the plate 74 is disposed flatwise against the adjacent matted surface of the blanket 43 and a sheet of rubber material 75 is disposed flatwise against the outer surface of said plate 74, said rubber sheet 75 being adhesively or otherwise suitably secured to said plate 74. The outer surface of the rubber sheet 75 carries a suitable light-sensitive sheet 76, such as a zinc plate, which is detachably secured to said rubber sheet 75, as by the adhesive tape strips 77, Fig. 2.

As illustrated in Figs. 1, 2 and 7, the left hand wing section 23d of the casting 23 supports a standard 78 which extends vertically and has its upper end secured by a bracket 79 to the left hand side member 23b of said casting 23. In a similar manner, the right hand wing section 23d of the casting 23 supports a vertical standard 80 which has its upper end secured to the right hand casting side member 23b by a bracket 81.

The aforesaid angle iron 36 which supports the frame F comprises oppositely extending extensions 36a, Fig. 7. To the left hand extension 36a, a bracket 82 is secured and this bracket slidably engages the standard 78. A second bracket 83 is secured to the right hand extension 36a of said angle iron 36 and this bracket 83 slidably engages the bracket 80.

From a consideration of Fig. 7, it will be noted that the standard 78 is circular in section and that the bracket 82 is in the form of a circular sleeve. The standard 80, however, is non-circular in section and the bracket 83 is in the form of a clevis. This construction is provided because desirable from a manufacturing viewpoint and, further, because preventing binding of the parts.

The above described bracket 28 for the jack screw 29 comprises a bearing 28a for a shaft 84, Fig. 2, which carries a gear 85 meshing with a gear 86 carried by the upper end of said jack screw 29. The shaft 84 carries a disk 87 and said bracket 28 comprises a section 28b disposed adjacent said disk.

The left hand extension 36a of the angle iron 36 has a vertical rod 88 secured thereto, the upper end of said rod being slidably supported in a bracket 89 carried by the left hand track member 58, Fig. 2. The upper end of the rod 88 has secured thereto a collar 90 which carries a pointer movable along a scale 91 carried by the left hand side member 23b of the casting 23.

The arrangement last described constitutes a convenient means for indicating the height of the frame F. The scale 91 may be suitably calibrated to indicate the height of said frame F for any particular adjustment of the jack screws 29, 29a as effected by the shaft 32. As will readily be understood, the disk 87 serves vernier-fashion to indicate the fraction of one of the calibrated spaces of the scale 91 to which the aforesaid pointer is moved when effecting adjustment of the frame F in the manner described above.

As shown in Fig. 1, the right hand wing section 23d of the casting 23 carries a plurality of spaced brackets 92 in which is journalled a threaded shaft 93 carrying an operating handle 94 at one end thereof. Secured to the base 1 is a bracket 95, Fig. 2, which carries the shank 96 of an internally threaded nut member 96a through which the shaft 93 extends and to which said shaft is threaded. The end of said shaft 93 opposite the handle 94 is journalled in and fixed to a projecting section 23e of the casting 23, Fig. 6. This casting section 23e carries a pointer 97 which extends beneath the aforesaid vertical plate 13. Disposed adjacent the end of the pointer 97 is a scale 98 carried by a bracket 99 fixed to a projecting section 2a of the above described bracket 2.

The nut member 96a is fixed with respect to the base 1 and, therefore, rotation of the shaft 93 causes the casting 23 and all parts carried thereby to be moved in a horizontal direction, this action necessarily following because one end of said shaft 93 is secured to the casting section 23e.

As well shown in Fig. 1, the vertical plate 13 previously referred to is provided with a centrally located square opening 13a. Immediately adjacent this opening, said plate 13 is recessed, as at 13b, Figs. 12 and 13, to provide a seat for an endless rubber sealing strip 100 of square configuration and of such shape that it fits the above noted plate recess 13b.

The printing plate holder is formed by two square frame plates 101 and 102 disposed flatwise against each other and secured together by rivets 103, Fig. 11. The thickness of the plate 101 is substantially the same as the thickness of the vertical plate 13 and, as shown in Figs. 10, 11 and 12, the plate 102 projects outwardly beyond all sides of the plate 101 to thereby form a square frame surface adapted for engagement with the sealing strip 100.

Each side of the frame plate 102, midway between the ends thereof, carries a small supplementary plate 104, Fig. 10, each of which defines a dowel hole 105. As shown in Fig. 10, the frame plate 102 carries a pair of spaced vertical angle irons 106 and a pair of spaced horizontal angle irons 107, all of these angle irons being secured to said frame plate 102 by screws 108 and each angle iron 106, midway between the ends thereof, carrying a handle 109, these handles being utilizable as hereinafter described for the purpose of manipulating the printing plate holder.

As illustrated in Figs. 10 and 11, each vertical angle iron 106, immediately adjacent the respective upper and lower ends thereof, carries a laterally projecting pin 110 to each of which an arm 111 is pivoted, each arm having a shank 112 threaded laterally therethrough, and each shank 112 comprising an operating head 113.

As is further shown in Figs. 10 and 12, the frame plate 102 comprises a plurality of projecting stud pins 114, two or more of these stud pins being formed on each horizontal and vertical surface of said frame plate 102.

The functions of the parts described immediately above, i. e., the arms 111, etc. and the stud pins 114 will be hereinafter described in detail.

As shown in Figs. 1, 5 and 10, the vertical plate 13, just below the opening 13a, has a horizontally disposed angle iron 115 secured thereto by screws 116 or the like. Midway between its ends, the horizontal surface of said angle iron 115 has an upstanding member 117 suitably secured thereto, this member 117 being spaced from the vertical plate 13 a distance slightly greater than the combined thickness of the two plates 102 and 104 which, as stated, form the printing plate holder.

In Figs. 1 and 5, a pair of horizontally alined dowel pins 118 and 119 are shown as projecting laterally from the vertical plate 13. These dowel pins may be secured to said plate 13 in any suitable manner. For example, as shown in Figs. 1 and 11, each dowel pin may be formed with a lower flanged surface 120, such surfaces being secured to the plate 13 by screws 121. The dowel pins 118 and 119 are disposed immediately adjacent the respective vertical sides of the opening 13a and the centers of said dowel pins coincide with a horizontal line which exactly bisects said opening 13a.

Spaced horizontally from each of the dowel pins 118 and 119 are the respective pivot pins 122 and 123, the former being threaded into the upstanding angle iron 11 and the latter being threaded into the upstanding angle iron 11a. Above the opening 13a, the vertical plate 13, midway between the vertical sides of said opening, has a small plate 124 secured thereto by screws 125, said plate 124 carrying a projecting pivot pin 126. Each of the pivot pins 122, 123 and 126 carries a pivoted arm 127 having a shank 128 threaded through an opening formed adjacent the free end thereof, each shank terminating in an operating head 129.

As shown in Fig. 1, the plate 124 comprises a laterally extending member 124a disposed in the path of the pivoted arm 127 to limit counter-clockwise movement thereof.

As shown in Figs. 10 and 11, the aforesaid plate 101 is provided with a central rectangular opening 101c within which is received the printing plate 130 which may be either a photographic positive or negative, said plate being herein illustrated as a transparent glass plate bearing a design or representation, the likeness of which is to be reproduced on the light-sensitive surface 76. The printing plate 130 is suitably maintained in proper adjusted position in the aforesaid opening 101c of the plate 101 in any suitable manner such, for example, as well known in the art. To this end, there may be utilized a plurality of faced clamping plates 131, Figs. 10, 12 and 13, which engage the bevelled edges of said printing plate 130, movement of these clamping plates 131 being controlled by threaded spindles 132 operated, respectively, by nuts 133 positioned in suitable manner so as to be movable only in a rotatable direction.

For the purpose of sealing the opening between the printing plate 130 and the plate 101, I provide a sealing frame 134 which is of rectangular configuration corresponding with the shape of said printing plate. As clearly shown in Fig. 10, the sealing frame 134 comprises four frame members 135, adjacent ends of each pair of which are connected together by a joint 136, these joints permitting the frame members 135 to move with respect to each other. The frame members 135 form a supporting frame to which is suitably secured a continuous channel-shaped rubber sealing member 137 of rectangular configuration, said sealing member having a first lateral flange 138 which engages the adjacent surface of the printing plate 130 and a second lateral flange 139 which engages the adjacent surface of the plate 101 whereby the space between the edges of the plates 101 and 130 are bridged to thereby seal this opening and prevent the passage of air therethrough. Preferably, channel-shaped members 140, of slightly less length than the respective frame members 135 are fitted into and secured to the channel-shaped sealing member 137 as shown in Fig. 11. With an arrangement of the character described, space is provided between the flanges 138 and 139 for the reception of the above described adjusting arrangements for the printing plate 130. By virtue of the provision of the joints 136, the sealing frame 134 is flexible at its corners so that it may adjust itself to any irregularities in the surface contour or thickness of the printing plate 130.

As clearly appears from a consideration of Fig. 10, the hereinbefore described sets of angle irons 106 and 107 serve as a pocket in which the sealing frame 134 is received. Further, the above described pivoted arms 111 and the shanks 112 serve, in an obvious manner, as an arrangement for securing said sealing frame 134 in its intended operative position as shown in Figs. 10 and 11. Furthermore, the pressure exerted by the threaded shanks causes the sealing strip flange members 138 and 139 to be thrust into close engagement with the respective plates 101 and 130 to thereby produce a sealed chamber interiorly of the channel shaped sealing member 137.

When the herein described mechanism is to be operated, a printing plate holder is chosen which has an opening 101c of the proper dimensions to receive the selected printing plate 130. Thereupon, in a manner familiar to those skilled in the art, the printing plate is positioned in said printing plate holder and clamped therein by manipulation of the above described adjusting nuts 133.

Upon completion of the operation described above, the pair of handles 109 are grasped and the combined printing plate and holder therefor are then positioned in the opening 13a of the vertical plate 13. In so doing, the dowel holes 105 of the printing plate holder 102 are registered with the respective dowel pins 118 and 119 and the printing plate assembly is then moved to operative position as shown in Fig. 11. In so doing, as will be observed from a consideration of Fig. 10, a set of the lowermost stud members 114 are seated upon the horizontal angle iron 115. After the printing plate assembly has been positioned as described above, the arms 127 are moved to the respective positions thereof as shown in Fig. 10 and then, by manipulation of the shanks 128, said printing plate assembly is positively locked in its intended operative position. In so doing, the plate 102 compresses the rubber sealing strip 100 and thereby produces a sealed joint at the junction between the plates 102 and 13.

After completion of the foregoing, the sealing frame 134 is placed in operative position as described above and as shown in connection with Figs. 10 and 11. With said sealing frame locked in this position, it results that the lowermost side, as shown in Fig. 11, of the space between the plates 130 and 101 is sealed from the atmosphere.

If it is assumed that the frame F bears an unexposed light-sensitive surface 76 and that said frame has been locked in its vertical position, it results that the apparatus is in condition for that stage of the operation wherein a selected area of the light-sensitive surface 76 is positioned opposite the printing plate 130. To this end, the handle 94 is operated to so rotate the shaft 93 that the casting 23 is horizontally moved in the proper direction to bring the selected area of the light-sensitive surface 76 in vertical alinement with respect to the printing plate 130. Thereupon, by manipulation of the handle 34, the shaft 32 is rotated to either raise or lower the frame F as required to position said selected area of the light-sensitive surface 76 in horizontal alinement with respect to said printing plate 130. Upon completion of these adjusting operations, the selected light-sensitive surface which is to receive the impression is positioned directly opposite the printing plate. As well understood in the art, the various pointers and scales hereinbefore described may be utilized in connection with the above described adjusting operations.

After completion of the positioning operation described above, the handle 10 is manipulated to thereby bodily move the plate 13 and the thereby-carried printing plate arrangement from left to right, Fig. 5, so that the various parts take the respective positions shown in Fig. 4. As clearly appears, the plate 13, when moving as just described, comes into engagement with the sealing strip 60 and, to some extent, compresses the latter so as to form a seal around the light-sensitive surface 76. It results, therefore, that said light-sensitive surface 76, partly by virtue of the operation last described, is entirely enclosed within a sealed chamber. Thus, the sealing strip 60 and the plate 13 serve to produce a seal around the periphery of said light-sensitive surface 76. Further, the space between the plate 13 and the member 101 is sealed by the sealing strip 100 while the space between said member 101 and the printing plate 130 is sealed by the sealing frame arrangement 134.

In accordance with the invention, the aforesaid sealed chamber which contains the light-sensitive surface 76 is evacuated so as to produce close contact between the printing plate 130 and said light-sensitive surface. To this end, as shown in Figs. 2 and 9, one of the frame members 40 is provided with a transverse passage in which is seated a member 141 having a passage 141a communicating with said sealed chamber. Opening into this passage 141a is a conduit 142 to which is connected a flexible hose 143 which, as shown in Fig. 1, may lead to one port of a control valve 144 having another port to which is connected a flexible conduit 145 leading to an air pump, not shown. As illustrated, the valve 144 is in communication with a gauge 146 which indicates the extent to which the aforesaid sealed chamber has been evacuated. As will readily be understood, the air pump noted above, under control of the valve 144, operates to evacuate to a desired degree the sealed chamber containing the light-sensitive surface 76. As a result of such evacuation, the printing plate 130, under the influence of atmospheric pressure effected on the exterior surfaces of the flexible member 43 and said printing plate 130, comes into close intimate engagement with said light-sensitive surface. At this time, the actual printing operation may be proceeded with in the manner well understood in the photo-composing art.

As illustrated in Figs. 10 and 11, the inner surface, i. e., that surface of the plates 13 and 101 which are engaged by the light-sensitive surface, are provided with spaced, shallow channels or grooves 147 which extend preferably vertically and horizontally and the presence of which aid in the production of the aforesaid partial vacuum.

After completion of the exposure operation noted above, the pressure interiorly of the described sealed chamber is restored to atmospheric value, and the plate 13 is moved to its retracted position by operation of the handle 10. Thereupon, the light-sensitive surface 76 may be shifted either vertically or horizontally so as to bring the same to the next predetermined exposure position. Then the plate 13 may be returned to the position of Fig. 4, the partial vacuum reestablished and the next printing operation proceeded with all as described above in detail. In this manner, the printing operations are proceeded with by successively performing the series of steps outlined above and, obviously, such printing operations may continue until the entire face of the light-sensitive surface has been exposed.

After completion of the final printing operation, the bar 56 is elevated to remove the locking pins 57 from the respective sleeve members 54a. Thereupon, the frame F may be swung from its vertical position to horizontal position as shown in Fig. 5 and, after removal of the tape strips 77, the light-sensitive surface 76 may be removed and thereafter developed in the usual manner. Upon completion of the foregoing, an unexposed light-sensitive surface may be secured to the rubber sheet 75, the frame F may be elevated to and locked in vertical position, and then the series of steps heretofore described may be performed in sequence in order to form on the light-sensitive surfaces spaced images of the representation on the printing plate.

In an important application of the invention and as well understood in the art, the hereinbefore described light-sensitive surface 76 may be a zinc press plate, or equivalent, which has relatively slight thickness and is used on offset printing presses. Under some circumstances, images are desirably produced on the light-sensitive surface of a glass or other transparent plate having substantial thickness and, if so, the arrangement is necessarily somewhat different from that hereinbefore described. Thus, as indicated in Figs. 13 and 13a, a metallic frame plate 150 having a generally rectangular opening 150a is secured in the position shown by the above described clamping blocks 71 and 73. The opening 150a of the frame plate 150 is adapted to receive the relatively thick transparent plate 151, the sensitized surface of which is adapted to "take" the images of the representations on the printing plate. Preferably, the plate 151 is of substantially the same thickness as the frame plate 150 and it is seated in the opening 150a so that adjacent sides thereof bear against the respective right angle edges of said opening at one corner thereof. The other adjacent sides of the plate 151 are engaged by clamps 152 adjustably mounted on bars 153 and held in adjusted position by screws 154 threaded into said bars 153 and extending through elongated slots formed in the respective clamps 152. The opening 150a is shaped on two sides to receive the bars 153. With said bars in place as shown in Fig. 13a, the clamps 152 may be adjusted against the adjacent edges of the plate 150 to positively secure this plate in its intended position in the frame F whereby said plate 150 may be moved toward and from printing position in generally the same manner as hereinbefore described in connection with the light-sensitive surface 76.

In accordance with the invention, the mechanism herein disclosed is adapted for use with printing plates of different dimensions. To this end, a plurality of printing plate holders may be supplied, it being understood that the frame plates 101 and 102 of all the plate holders will have the same exterior dimensions corresponding with the dimensions of the aperture 13a of the plate 13. However, the interior dimensions of the various sets of frame plates 101, 102 will be different in accordance with the different external dimensions of the various printing plates. With the multiple plate holders thus supplied, it will be understood that multiple and different sized sealing frames 134 are necessarily provided.

Along the lines of the foregoing, it will be understood that a plurality of frame plates 150, Figs. 13 and 13a, may be supplied, each frame plate having a different sized opening so that a plurality of different sized glass plates 151 may be utilized with the disclosed machine. With the same frame plate 150 and varying widths of bars 153, different size glass plates may be held within the opening 150a of said frame plate 150.

In view of the foregoing description, it will be clearly understood that my invention relates to a photo-composing machine of the vertical type, i. e., one in which the printing plate and the light-sensitive surface are disposed in adjacent vertical planes during the exposure intervals. With a machine of this advantageous type, my invention further relates to the enclosure of the entire light-sensitive surface in the chamber which is to be evacuated in order to obtain close contact between the printing surfaces.

With prior photo-composing machines of the vertical adjustable type, only that part of the light-sensitive surface opposite the printing plate is included in the vacuum chamber. With such an arrangement, the advantageous results of the present invention may not be realized. Thus, by my present invention which, as stated, relates to a machine of the vertical type, a more perfect contact is obtained between printing surfaces than has heretofore been possible and this results in improvement in detail of the representation produced on the light-sensitive surface. At the same time, the control effected by the vacuum on the entire area of the light-sensitive surface rather than on local areas as in the prior art results in the production of an improved zinc plate, or equivalent.

Thus, the present invention is particularly advantageous in that the light-sensitive plate or surface is entirely enclosed within the vacuum chamber of a photo-composing machine of the vertical type whereby relative adjustment between the printing plate and light-sensitive surface may be attained in a manner which is impossible of attainment with prior art arrangements of either vertical or horizontal type. These and other advantages incident to the invention will be readily apparent to those skilled in the art.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In combination, means for supporting a sensitized member in a vertical plane, means for supporting a printing member in an adjacent vertical plane, means for effecting relative movement between said sensitized member and said printing member while said members are maintained in spaced relation with respect to each other, means forming a vacuum chamber within which said sensitized member is entirely enclosed, and means for effecting relative movement between said sensitized member and said printing member to bring them into contacting relation.

2. In combination, means for supporting a sensitized member in a vertical plane, means for supporting a printing member in an adjacent vertical plane, means for effecting relative movement between said sensitized member and said printing member while said members are maintained in spaced relation with respect to each other, such relative movement being produced in vertical and horizontal directions, means forming a vacuum chamber within which said sensitized member is entirely enclosed, and means for effecting relative movement between said sensitized member and said printing member to bring them into contacting relation.

3. In combination, means for supporting a sensitized member in a vertical plane, means for supporting a printing member in an adjacent vertical plane, means for effecting relative movement between said sensitized member and said printing member while said members are maintained in spaced relation with respect to each other, such relative movement being produced in vertical and horizontal directions, means forming a vacuum chamber within which said sensitized member is entirely enclosed, means for effecting relative movement between said sensitized member and said printing member to bring them into contacting relation, and means for evacuating said vacuum chamber to bring said sensitized member and said printing member into printing relation.

4. In combination, means for supporting a sensitized member in a vertical plane, means for supporting a printing member in an adjacent vertical plane, means for effecting relative movement between said sensitized member and said printing member while said members are maintained in spaced relation with respect to each other, means forming a vacuum chamber within which said sensitized member is entirely enclosed, said last named means comprising a resilient sealing strip disposed between said sensitized member and said printing member, and means for moving said printing member toward said sensitized member to bring these members into contacting relation and to compress said sealing strip, said sensitized member and said printing member being maintained substantially in parallel relation while said printing member is being controlled by said last named means.

5. In combination, means for supporting a sensitized member in a vertical plane, means for supporting a printing member in an adjacent vertical plane, means forming a vacuum chamber within which said sensitized member is entirely enclosed, said last named means comprising a resilient sealing strip disposed between said sensitized member and said printing member, and means for effecting relative movement between said sensitized member and said printing member to bring these members into contacting relation and to compress said sealing strip, the supporting means for the sensitized member comprising a pivot arrangement whereby said sensitized member may be moved from vertical to horizontal position at will.

6. In combination, means for supporting a sensitized member in a vertical plane, means for supporting a printing member in an adjacent vertical plane, means for moving said sensitized member in a plurality of directions while said sensitized member and said printing member are maintained in spaced relation with respect to each other, means forming a vacuum chamber within which said sensitized member is entirely enclosed, said last named means comprising a resilient sealing strip disposed between said sensitized member and said printing member, and means for effecting relative movement between said sensitized member and said printing member to bring these members into contacting relation and to compress said sealing strip.

7. In combination, means for supporting a sensitized member in a vertical plane, means for supporting a printing member in an adjacent vertical plane, means for moving said sensitized member in a plurality of directions at right angles to each other while said sensitized member and said printing member are maintained in spaced relation with respect to each other, means forming a vacuum chamber within which said sensitized member is entirely enclosed, said last named means comprising a resilient sealing strip disposed between said sensitized member and said printing member, and means for effecting relative movement between said sensitized member and said printing member to bring these members into contacting relation and to compress said sealing strip.

8. In combination, means for supporting a sensitized member in a vertical plane, means for supporting a printing member in an adjacent vertical plane, means for moving said sensitized member in a horizontal direction while maintaining the same parallel with respect to said printing member, means forming a vacuum chamber within which said sensitized member is entirely enclosed, said last named means comprising a resilient sealing strip disposed between said sensitized member and said printing member, and means for effecting relative movement between said sensitized member and said printing member to bring these members into contacting relation and to compress said sealing strip.

9. In combination, means for supporting a sensitized member in a vertical plane, means for supporting a printing member in an adjacent vertical plane, means for moving said sensitized member in either a vertical or a horizontal direction while maintaining the same parallel with respect to said printing member, means forming a vacuum chamber within which said sensitized member is entirely enclosed, said last named means comprising a resilient sealing strip disposed between said sensitized member and said printing member, and means for effecting relative movement between said sensitized member and said printing member to bring these members into contacting relation and to compress said sealing strip.

10. In combination, means for supporting a sensitized member in a vertical plane, means for supporting a printing member in an adjacent vertical plane, means for moving said sensitized member in either a vertical or a horizontal direction while maintaining the same parallel with respect to said printing member, means forming a vacuum chamber within which said sensitized member is entirely enclosed, said last named means comprising a resilient sealing strip disposed between said sensitized member and said printing member, means for effecting relative movement between said sensitized member and said printing member to bring these members into contacting relation and to compress said sealing strip, and means for evacuating said vacuum chamber to bring said sensitized member and said printing member into printing relation.

11. In combination, means for supporting a sensitized member in a vertical plane, means for supporting a printing member in an adjacent vertical plane, means for moving said sensitized member in either a vertical or a horizontal direction while maintaining the same parallel with respect to said printing member, means forming a vacuum chamber within which said sensitized member is entirely enclosed, said last named means comprising a resilient sealing strip disposed between said sensitized member and said printing member, and means for moving said printing member toward said sensitized member to bring these members into contacting relation and to compress said sealing strip, said sensitized member and said printing member being maintained substantially in parallel relation while said printing member is being controlled by said last named means, the supporting means for the sensitized member comprising a pivot arrangement whereby said sensitized member may be moved from vertical to horizontal position at will.

12. In combination, means for supporting a sensitized member in an upright position, means for supporting a printing member in an adjacent upright position, means for effecting relative movement between said sensitized member and said printing member while said members are maintained in spaced relation with respect to each other, means forming a vacuum chamber within which said sensitized member is entirely enclosed, means for effecting relative movement between said sensitized member and said printing member to bring them into contacting relation and means for evacuating said vacuum chamber to bring said sensitized member and said printing member into printing relation.

13. In combination, means for supporting a sensitized member in an upright position, means for supporting a printing member in an adjacent upright position, means for effecting relative movement between said sensitized member and said printing member while said members are maintained in spaced relation with respect to each other, means forming a vacuum chamber within which said sensitized member is entirely enclosed, means for effecting relative movement between said sensitized member and said printing member to bring them into contacting relation, and means for evacuating said vacuum chamber to bring said sensitized member and said printing member into printing relation, the supporting means for the sensitized member comprising a pivot arrangement whereby said sensitized member may be moved from vertical to horizontal position at will.

14. In combination, means for supporting a sensitized member in an upright position, means for supporting a printing member in an adjacent upright position, means for effecting relative movement between said sensitized member and said printing member while said members are maintained in spaced relation with respect to each other, means forming a vacuum chamber within which said sensitized member is entirely enclosed, said last named means comprising a resilient sealing strip disposed between said sensitized member and said printing member, means for effecting relative movement between said sensitized member and said printing member to bring these members into contacting relation and to compress said sealing strip, and means for evacuating said vacuum chamber to bring said sensitized member and said printing member into printing relation, the supporting means for the sensitized member comprising a pivot arrangement whereby said sensitized member may be moved from vertical to horizontal position at will.

ALEXANDER T. KOPPE.